Patented Sept. 26, 1922.

1,430,036

UNITED STATES PATENT OFFICE.

WALTER O. SNELLING, OF ALLENTOWN, PENNSYLVANIA.

PLASTIC PRODUCT.

No Drawing.    Application filed October 20, 1920. Serial No. 418,302.

*To all whom it may concern:*

Be it known that I, WALTER O. SNELLING, a citizen of the United States, residing at Allentown, in the county of Lehigh and State of Pennsylvania, have invented certain Improvements in Plastic Products, of which the following is a specification.

My invention relates to improvements in plastic products, and more particularly to improvements in the preparation of plastic materials useful as substitutes for chicle, gutta percha and substances of like nature.

I have discovered that by masticating or working together a rubber-like material and a resin ester, there occurs a blending of the two materials to form products having very desirable properties as substitutes for gutta percha, chicle and like materials.

The resin esters which I prefer to use are the glycol and the glycerol esters of ordinary rosin or colophony and I have found these materials to be particularly suited to the manufacture of masticatory products useful as substitutes for chicle in the manufacture of chewing gum.

As an example of my present invention, I will describe a process which I may employ in the preparation of a chicle substitute from a rubber-like material prepared from a vulcanized oil by the process described in my U. S. Patent 1,315,246, by uniting or blending this product with the glycerol ester of colophony.

I first prepare a factis by incorporating 80 parts by volume of cottonseed oil, 20 parts by volume of carbon bisulfide, and 20 parts by volume of sulfur chloride. This mixture is stirred and poured out in a thin film on a smooth surface, where it soon hardens. To 100 parts by weight of the hardened film, after being ground up to form a meal, I add 3 parts by weight of methyl alcohol and 170 parts by weight of sulfur mono-chloride. The factis soon undergoes depolymerization and liquefies, and after a period of about two hours I stir the liquefied product into a volume of water which should preferably be ten or twenty times the volume of the depolymerized fluid. The water causes the depolymerized factis to repolymerize, and about 15 minutes after being stirred into the water I sheet the repolymerized product by passing it between rolls. By the treatment described I obtain the vulcanized oil product in the form of a light yellow coherent sheet. I next prepare a glycerol ester of colophony by heating together with constant stirring 100 parts of ordinary rosin or colophony with 10 to 16 parts of substantially anhydrous glycerin, for a period of from 3 to 4 hours, the temperature at the beginning of the period of heating being about 150° C., and being gradually increased during the period of heating to the final temperature of 280° C., the heating being continued until esterification is substantially complete. By the means described I obtain a material which in general appearance greatly resembles rosin, but which is free from the objectionable taste which rosin gives to chicle substitutes of which it is a component.

I next mix together equal weights of my vulcanized oil product and the resin ester, and incorporate the two materials at a temperature of about 100° C. for a period of one or two hours, preferably bringing about this incorporation in a steam-jacketed mechanical mixer. The vulcanized oil product and the glycerol ester of colophony blend to give a body which after cooling forms an excellent chicle substitute possessing marked masticatory and plastic properties.

Instead of employing a vulcanized oil product made as described in the above example, I may employ any of the vulcanized and depolymerized products made by the methods described in my U. S. Patent No. 1,315,246, or I may use any suitable natural of synthetic rubber or gutta. Instead of employing the glycerol ester of colophony, I may employ with equal advantage any other suitable organic resin ester, such for example as the glycol or naphthol esters of rosin or other resin, my invention broadly comprising the preparation of plastic and masticatory products by the uniting or blending of a rubber-like material with an ester prepared from colophony or ordinary rosin, or equivalent resin acid.

It will be evident that many modifications may be made without departing from the spirit and scope of the process here disclosed, and it is therefore to be understood that no limitations are to be imposed upon my invention except such as are indicated in the appended claims.

I claim:

1. A chicle substitute comprising a rosin ester.

2. A chicle substitute comprising an ester of colophony.

In testimony whereof, I have hereunto subscribed my name this 18th day of October, 1920.

WALTER O. SNELLING.